United States Patent [19]

Mohn et al.

[11] Patent Number: 4,892,657
[45] Date of Patent: Jan. 9, 1990

[54] SPACER FOR GUIDING FLOWING MEDIUM

[75] Inventors: Jürgen Mohn, Reinbek; Wilhelm Heine, Hamburg, both of Fed. Rep. of Germany

[73] Assignee: DT Membranfilter Vertriebs GmbH, Hamburg, Fed. Rep. of Germany

[21] Appl. No.: 191,280

[22] Filed: May 6, 1988

[30] Foreign Application Priority Data

May 7, 1987 [DE] Fed. Rep. of Germany ....... 3715183

[51] Int. Cl.$^4$ .............................................. B01D 13/00
[52] U.S. Cl. ................................ 210/232; 210/321.84; 210/347; 210/456; 210/547
[58] Field of Search ............. 210/232, 321.75, 321.84, 210/347, 433.1, 434, 450, 486, 247, 541, 542, 456, 336

[56] References Cited

U.S. PATENT DOCUMENTS

| | | | |
|---|---|---|---|
| 3,333,706 | 8/1967 | Israli | 210/321.75 |
| 3,398,833 | 8/1968 | Marks et al. | 210/347 |
| 3,847,818 | 11/1974 | Madgen et al. | 210/321.84 |
| 3,943,057 | 3/1976 | Janet et al. | 210/321.84 |
| 4,228,014 | 10/1980 | Timm et al. | 210/321.84 |
| 4,698,154 | 10/1987 | Mohn et al. | 210/232 |
| 4,783,262 | 11/1988 | Ostreicher et al. | 210/347 |

FOREIGN PATENT DOCUMENTS 3327431 2/1985 Fed. Rep. of Germany .

*Primary Examiner*—Richard V. Fisher
*Assistant Examiner*—Christopher Upton
*Attorney, Agent, or Firm*—Becker & Becker, Inc.

[57] ABSTRACT

A spacer for guiding flowing medium, especially in apparatus for filtering and separating flowing medium via reverse osmosis and ultrafiltration. The spacer has a central hole that essentially serves for the clamping together of a plurality of disk-like spacers. A filter element is disposed between each two spacers, with flowing medium flowing about both sides of the filter element. To reduce pressure loss in the flowing medium, a plurality of spaced-apart openings through which flowing medium passes are disposed about the central hole of the spacer.

18 Claims, 5 Drawing Sheets

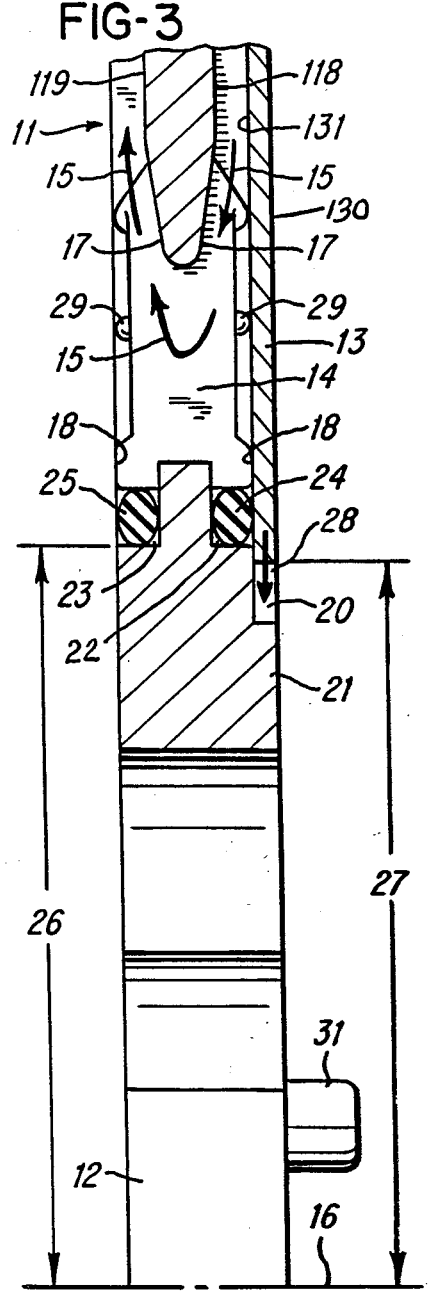
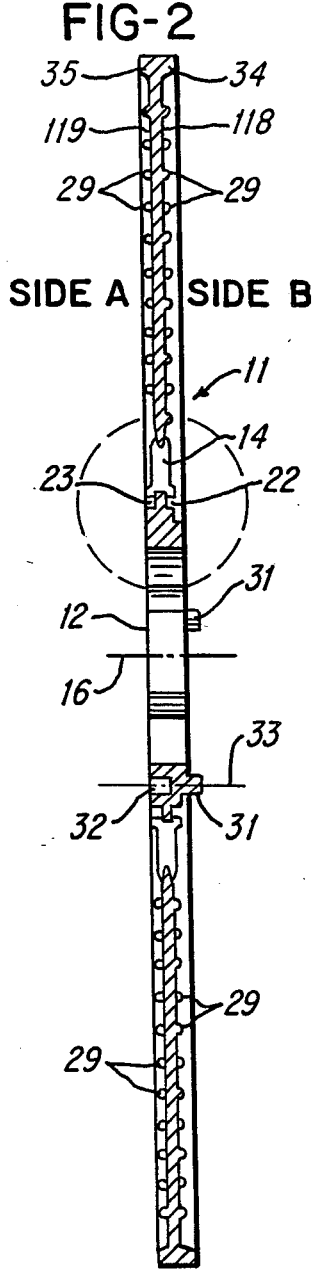

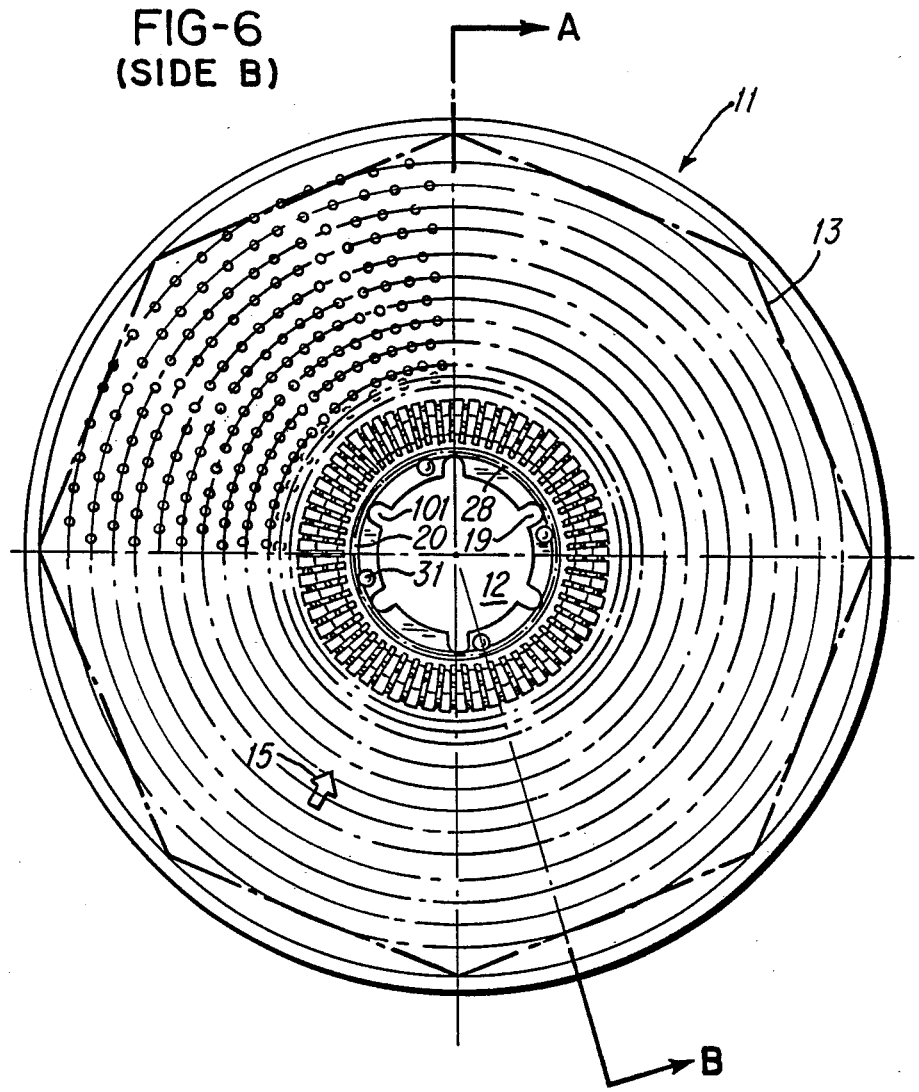

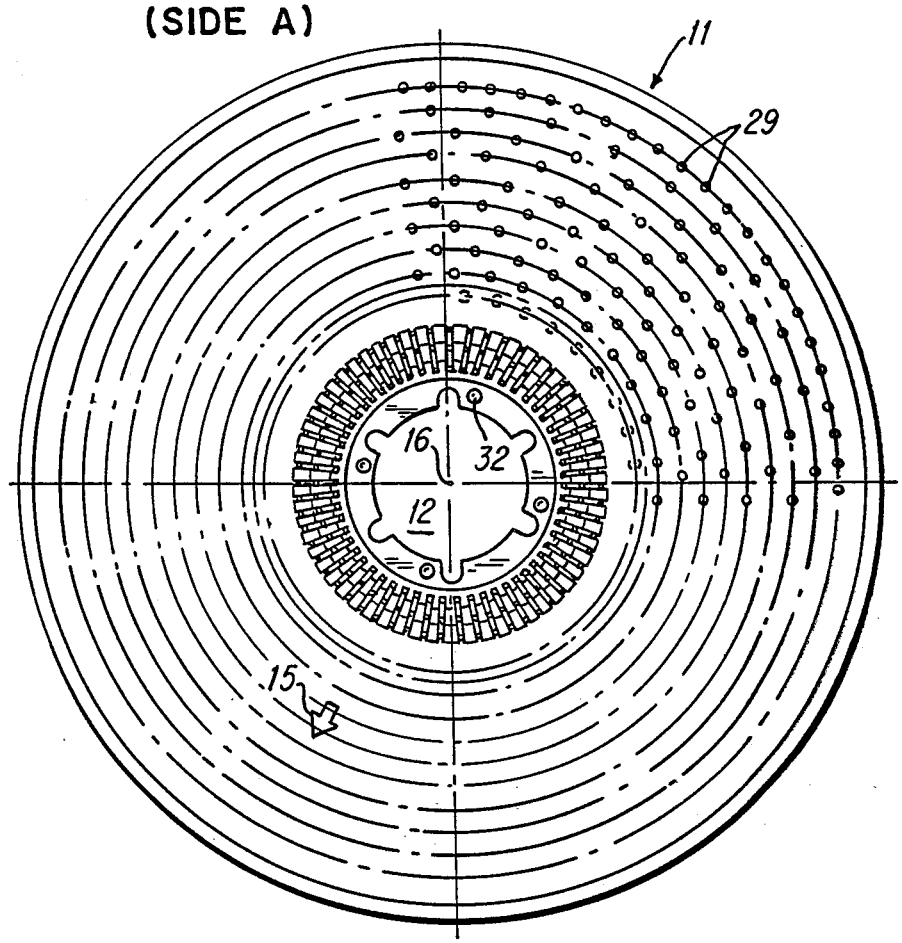
FIG-7 (SIDE A)
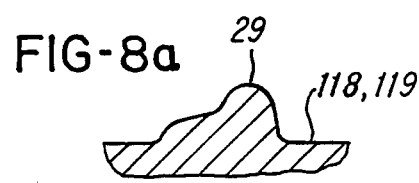
FIG-8a
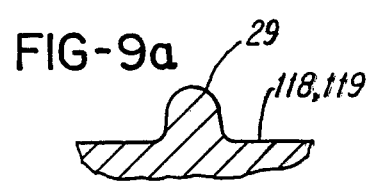
FIG-9a
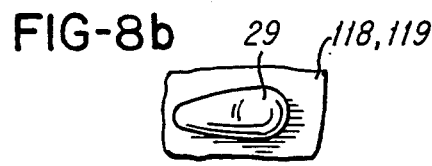
FIG-8b
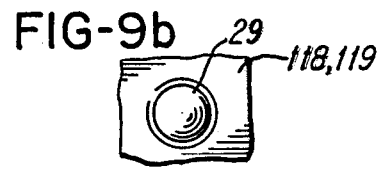
FIG-9b

SPACER FOR GUIDING FLOWING MEDIUM

BACKGROUND OF THE INVENTION

The present invention relates to a spacer for guiding flowing medium, especially in apparatus for filtering and separating such flowing medium via reverse osmosis and ultrafiltration, with a filter element being disposed between each two spacers, which have an essentially disk-like configuration with a central hole, and about which the flowing medium flows.

A multi-part device for accommodating filter elements is known, for example, from the apparatus for separating and filtering flowing medium disclosed in German Offenlegungsschrift 33 27 431 Mohn et al dated Feb. 14, 1985 and corresponding to U.S. Pat. No. 4,698,154-Mohn et al dated Oct. 6, 1987, where each individual filter unit of a filter element stack that is assembled in any desired number, comprises a carrier plate, a guide plate, and a diaphragm that is disposed between these two plates. With this heretofore known apparatus, the periphery of the diaphragm is preferably glued or otherwise joined to the periphery of the carrier plate within the axial through-flow opening.

When talking about such a known compact construction of filter units to form a filter element stack, one refers to a so-called disk modulus, where due to the construction of the individual filter units, the disks have a relatively great inherent stability and are relatively resistant to pressure.

However, consideration can be given if so-called diaphragm pads are to be used in such an apparatus; with these diaphragm pads include two outer diaphragm sheets that are hermetically sealed to flowing medium on their outer edges consideration also can be given to where the filtrate flows, for example, to a hole disposed in the center of the diaphragm pad, and from there being suitably collected and discharged to a filtrate outlet. But heretofore known disk-like spacers are not suitable for cooperating with such diaphragm pads because with such known spacers the flowing medium does not flow about the actual filter element (diaphragm pad) to a sufficient extent. Due to the construction of the heretofore known spacers, a considerable partial pressure drop occurs between the inlet and outlet of the flowing medium in the apparatus. This is a drawback, especially for large filter element stacks, and limits the efficiency of the apparatus. The reason for this is essentially that the actual diaphragm is placed upon the carrier plate and the guide plate, so that the flowing medium, for example untreated water, is increasingly held back as it flows through the filter element stack. The result, as indicated above, is a significant drop in partial pressure between the inlet and the outlet for the flowing medium.

It is therefore an object of the present invention to provide a spacer that permits the flowing medium to flow well about the spacer itself, as well as about the filter element that is disposed upon the spacer and is, for example, in the form of a diaphragm pad, so that even with large filter element stacks, the partial pressure differentials of the flowing medium between the inlet and the outlet are held within acceptable limits, the flow of the flowing medium is optimized, and the filter element is accommodated in such a way as to be resistant to differential pressure.

BRIEF DESCRIPTION OF THE DRAWINGS

This object, and other objects and advantages of the present invention, will appear more clearly from the following specification in conjunction with the accompanying schematic drawings, in which:

FIG. 2 is a cross-sectional view of one exemplary embodiment of the inventive spacer taken along the line A-B in FIG. 6;

FIG. 3 is an enlarged cross-sectional view of a portion of the spacer of FIG. 2;

FIG. 6 is a view from above, side B, of the spacer of FIG. 2;

FIG. 7 is a view from below, side A, of the spacer of FIG. 2;

FIG. 8a is a cross-sectional view of one exemplary embodiment of a boss;

FIG. 8b is a plan view of the boss of FIG. 8a;

FIG. 9a is a cross-sectional view of another exemplary embodiment of a boss; and FIG. 9b is a plan view of the boss of FIG. 9a.

SUMMARY OF THE INVENTION

Figure 1:
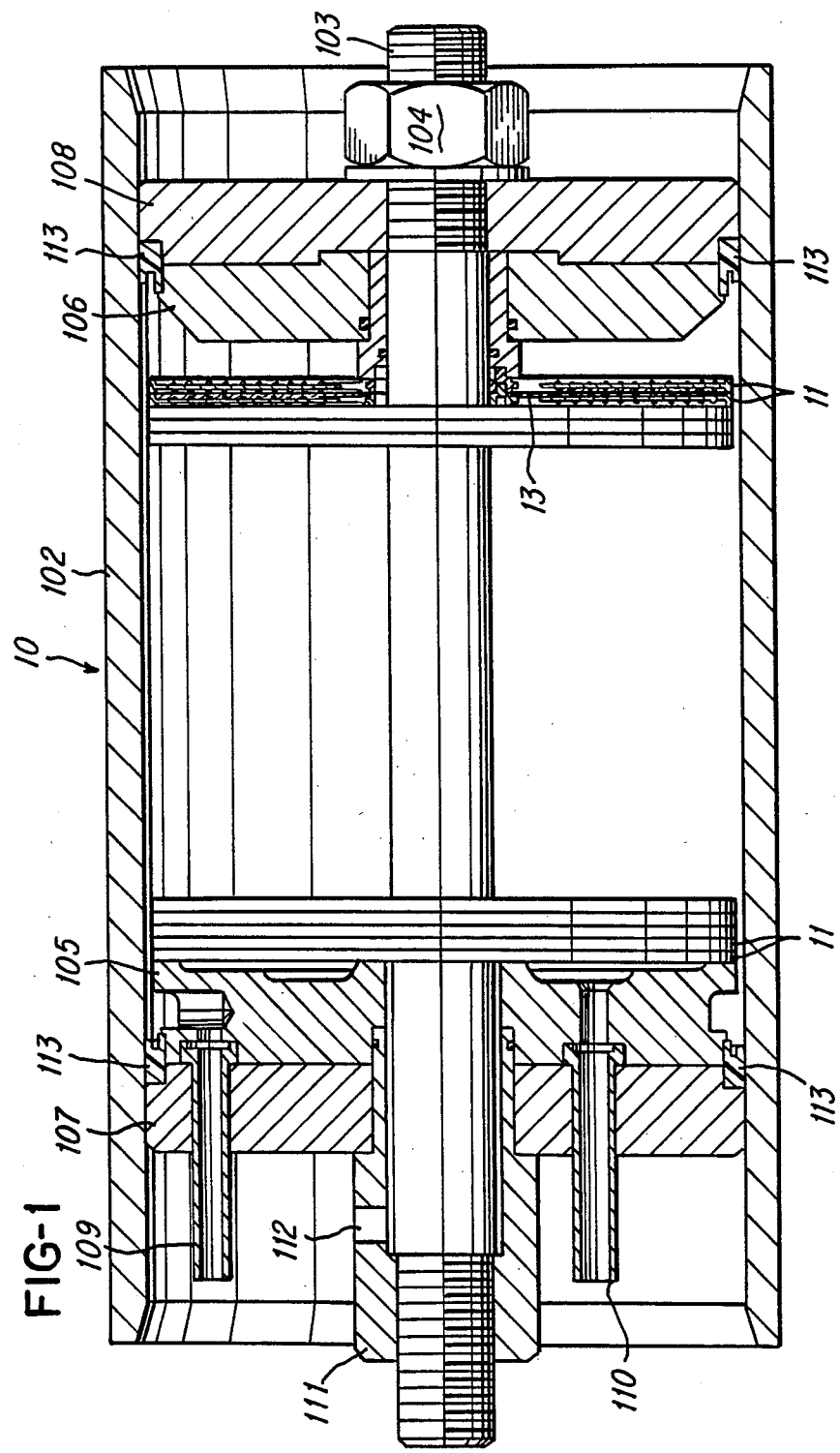
FIG. 1 is a cross-sectional view of an apparatus for filtering and separating a flowing medium, with a plurality of filter elements and the inventive spacers forming a filter element stack.

The spacer of the present invention is characterized primarily in that a plurality of spaced-apart openings through which the flowing medium passes are disposed about the central hole of the spacer.

The advantage of the inventive construction is essentially that the flow of the flowing medium can to a large extent be effected in an unobstructed manner; in other words, the flow of the flowing medium can be optimized relative to the flow that exists with the heretofore known spacers.

The aforementioned inventive openings, which provide communication between the two surfaces of the spacer in the region of the central opening thereof, actually operate as a sluice or drain at a location of the spacer where the flowing medium has swept over or flowed about the entire surface region of one surface.

The openings are advantageously slot-shaped, with the long sides of the slots, which are longer than the transverse ends, essentially extending radially away from the center of the hole of the spacer. In this way, along with optimum stability of the spacer in the region of the openings, an optimized opening for the passage of flowing medium is provided. It is furthermore advantageous if the openings have a trapezoidal cross-sectional shape.

Pursuant to one advantageous embodiment of the present invention, in order to prevent turbulence in the flowing medium in the region where the medium enters the openings, which turbulence would necessarily lead to an increase of the partial pressure differentials in this region, the spacer, immediately radially adjacent the opening, has a thickness that tapers in the direction toward the central hole. Thus, the flowing medium can flow into the opening in a ramp-like, i.e. inclined, manner, and can again flow radially outwardly from this opening onto the other surface in an inclined manner.

In order to assure that in the immediate region of the openings of the spacer these openings do not become clogged in a valve-like manner as a result of the filter element (diaphragm pad) and the internal pressure that automatically also builds up in the filter element due to the filtrate discharging therein, it is advantageous to dispose between each two spaced-apart openings, respective bosses that project from both surfaces of the spacer. In this way, the filter element is kept clear of the openings of the spacer precisely in this critical region.

Provision is made so that the filtrate, which exits from the inner ends out of the filtrate discharge holes that are generally disposed centrally between the diaphragm sheets, can be collected in an unobstructed manner and can be supplied to a filtrate discharge. Accordingly, the inner rim region of the central hole of the spacer is advantageously provided with a plurality of filtrate discharge holes, which can have a slot-like configuration. These discharge holes extend into a filtrate discharge channel that is disposed at a prescribed distance about the center of the hole; this discharge channel is provided for the filtrate that exits from the end of the filter element. The filtrate discharge channel is preferably delimited by a shoulder portion that is formed on the surface of the spacer and projects therefrom.

In principle, the seal provided between the spacer and the filter element in the region of the end filtrate discharge from the filter element can have any desired shape. However, it is particularly advantageous to form about the central hole of the spacer, on both surfaces thereof, a respective circumferential, groove-like recess for accommodating a sealing ring. In this connection, the radial distance of the recesses to the center of the hole of the spacer is greater than the radial distance between the center of the hole and the inner rim of a central hole of the filter element. The sealing elements that are placed in the groove-like recesses, for example, can be O-rings, with the recesses being embodied in such a way that the O-rings fit tightly therein.

Provision is made to provide a flow of medium that is as unobstructed as possible also on the spacer surfaces, which on both sides have a disk-like configuration. In other words, to prevent the filter element from resting directly upon these surfaces as much as possible, accordingly a further advantageous specific embodiment of the inventive spacer, is to provide on at least one of the spacer surfaces a plurality of raised bosses that project from this surface. Any desired suitable number of these bosses can be provided on the spacer surface or surfaces at any desired distance from one another; for example, the bosses can be provided along imaginary graduated rings of circular spacers.

Advantageously, the land surfaces, which are essentially disposed parallel to the spacer surfaces, are also respectively provided with at least one raised boss that projects from this surface.

The bosses themselves, relative to a plane that is parallel to the surface, can have an essentially spherical or circular cross-sectional shape, or even an essentially drop-like cross-sectional shape, with the latter largely eliminating the formation of turbulence when flowing medium flows along past such a boss, and furthermore reduces pressure loss.

Each spacer and filter element form a filter unit, with any desired number of filter units forming a filter element stack. In order to be able to precisely assemble such filter units to a filter element stack of any size without further structural measures having to be undertaken, the spacer is advantageously provided on one surface, in a region immediately around the central hole, with a plurality of raised, pin-like projections that extend from this surface; on the other surface, the spacer is provided with a plurality of recesses, with a projection from one side and a recess from the other side being spaced the same distance from the center of the spacer hole relative to an imaginary common central axis that extends through this projection and recess.

Thus, the pin-like projection of one spacer can be inserted into the recess of an adjacent spacer, etc., so that an absolutely uniformly aligned filter element stack can be assembled in an effortless manner. In this connection, the projections and the recesses preferably have the same cross-sectional shape.

In the region of its outer periphery, the spacer itself has an outer circumferential rim on both surfaces, with one of the rims being higher by at least the thickness of a filter element relative to the normal surface of the spacer surface, so that a filter element (diaphragm pad) can be placed in the recessed area formed by this somewhat higher rim. In so doing, the outer diaphragm sheets of the filter element are preferably disposed on the bosses, so that they do not come into direct contact with the surfaces of the spacer.

The spacer itself, for example, can be made out of any desired suitable material that while being lightweight, provides the spacer with great strength and stability. However, the spacer is advantageously made of plastic, preferably an acrylonitrile-butadiene-styrene copolymer (ABS). ABS is particularly suitable for use where a high quality for the filtrate is required, for example of drinking water quality or even high purity water quality. Other particularly suitable plastics are polystyrenes, such as Luran, and styrene-acrylonitrile-copolymers (SAN).

Further specific features of the present invention will be described in detail subsequently.

DESCRIPTION OF PREFERRED EMBODIMENTS

Referring now to the drawings in detail, FIG. 1 illustrates one example of an apparatus 10 for filtering and separating flowing medium by reverse osmosis and ultrafiltration. In this apparatus, a plurality of filter elements 13 (FIG. 3) and spacers 11 are stacked together to form a stack of filter elements of predetermined length.

The apparatus 10 will be briefly explained in order to provide a better understanding of the construction of the spacer 11 in cooperation with a filter element 13 that is in the form of a diaphragm pad. The apparatus 10 essentially comprises a tubular housing 102. Spacers 11 and filter elements 13 are alternately placed in the housing 102; in other words, a filter element 13 is disposed between each two spacers 11. Only at both ends of the thus-formed filter element stack is a given spacer 11 not provided with a filter element 13. At the connection end of the filter element stack, a connection member 105 is provided, and at the opposite end of the filter element stack, an end member 106 is provided. An outer terminal mounting flange 107 is placed upon the connection member 105, while an outer end flange 108 is placed upon the end member 106. The filter element stack, and the other previously mentioned elements, are held together by a central securing bolt 103 that extends through appropriate central holes of these elements. On both ends, nuts 104 and 111 that are threaded onto appropriate threaded extensions of the central securing bolt 103 hold the unit together within the housing 102. Extending through the terminal mounting flange 107 and the connection member 105 are an inlet 109 for the supply of flowing medium 15, and an outlet 110 for exiting flowing medium.

Flowing medium 15 coming in through the inlet 109 enters the interior of the housing 102 via the gap between the filter element stack and the inner wall of the housing. The flowing medium 15 then passes from this gap into the space formed between the end member 106 and the adjacent spacer 11. The flowing medium 15 enters through the openings 14 in the spacer 11, and flows along the inner surface 119 of the spacer. From there, in the region of the rim 34, the flowing medium 15 is deflected about a filter element 13 that is disposed between the spacer and an adjacent spacer, with the medium then again flowing back in the direction toward the center in order to once again flow through an opening 14 of the second spacer 11. From there, the deflection of the flowing medium is repeated in the same manner for the subsequent adjacent spacers 11 of the entire filter element stack. From those ends of the filter element (diaphragm pad) that are directed toward the central filtrate discharge hole or filtrate discharge channel, the filtrate exits and passes along suitable flow channels, which will be described in detail subsequently, along the central securing bolt 103 and out of the filtrate outlet for further processing. After the concentrated flowing medium 15 has passed through the entire filter element stack in a quasi meander-like manner, this medium passes into an annular collecting zone that is formed in the connection member 105; from there, the medium flows out via the outlet 110. The overall filter element stack is held within the housing 102 via suitable seals 113.

FIG. 2 is a cross-sectional view of a spacer 11 as it is used in the aforementioned filter element stack. In the illustrated embodiment, the spacer 11 has a circular cross-sectional shape, and is delimited by two disk-shaped surfaces 118 and 119. The axis of the spacer 11 is symbolized by the center line 16 of a central hole 12 of the spacer. Around the central hole 12, the spacer 11 is provided with a plurality of openings 14 that are spaced from one another and through which the flowing medium 15 passes; this can be seen in FIGS. 3 and 4, and will be described in detail subsequently. In the illustrated embodiments, the openings 14 are disposed on a specific imaginary circle and at essentially the same distance from and around the center line 16 of the hole 12 (see FIGS. 6 and 7).

Figure 4:
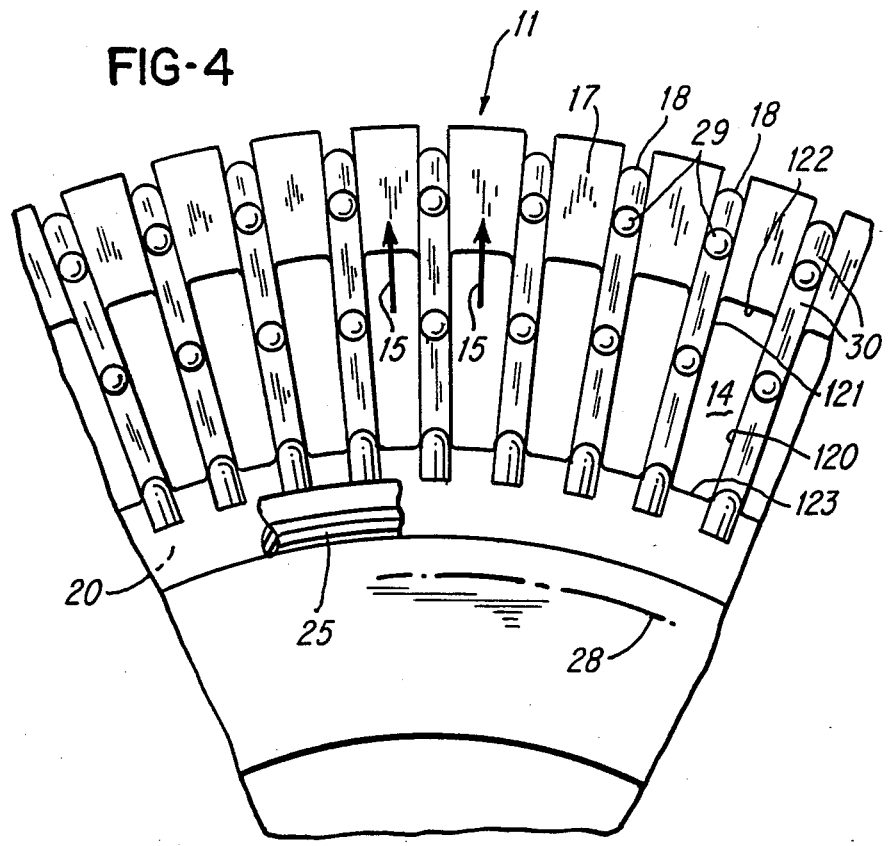
FIG. 4 is a further enlarged partial plan view of the inner rim region of the spacer in the region of its central hole, and in particular is an enlargement of the dashed-line encircled region of FIG. 2.
Figure 5:
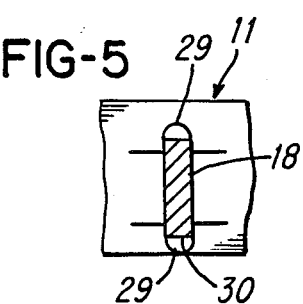
FIG. 5 is a cross-sectional view through a land of the spacer of FIG. 4.

The openings 14 have a slot-like configuration, and have a trapezoidal cross-sectional shape (FIG. 4). The long sides 120, 121 of the slot-like openings 14 are longer than the transverse ends 122, 123 thereof. In a zone that is directly adjacent the opening 14 in a radial direction, and is remote from the hole 12, the thickness of the spacer 11 tapers in a direction toward the central hole 12; this is indicated by the reference numeral 17 in FIG. 4. The immediate tip of the tapered portion can have a semicircular cross-sectional shape.

Disposed between each two spaced-apart openings 14 is a land or raised portion 18 that essentially projects orthogonally from the surfaces 118, 119.

As can be seen, for example, in FIG. 6, the central hole 12 is provided in its peripheral region with a plurality of discharge holes. As can be seen in FIGS. 3 and 6, these filtrate discharge holes 19 extend into a filtrate discharge channel 20 that is disposed around the hole 12 at a specific distance from the center line 16 thereof. The filtrate discharge channel 20 is delimited by a shoulder portion 21 that is part of the spacer 11 itself. The shoulder portion 21 is provided on the surface 118 and projects therefrom.

Disposed around the central hole 12, on both of the surfaces 118 and 119, is a respective circumferential, groove-like recess 22, 23. These recesses serve to receive sealing rings 24 and 25, such as O-rings. As illustrated in FIG. 3, these seals 24, 25 are tightly fit in the groove-like recesses 22, 23. The radial distance 26 between the center line 16 and the recesses 22, 23 is greater than the radial distance between the center line 16 and the inner periphery of a central filtrate discharge hole 28 of the filter element 13 that is in the form of a diaphragm pad.

Such a filter element 13, the outer shape of which is not illustrated in detail, can have any desired circular or polygonal outer peripheral boundary. However, in any case the filter element 13 is a disk, with an outer contour such that the filter element can be placed upon the surface 118 of the spacer 11 in such a way that the filter element does not sealingly close off the outer rim region of the spacer 11. In this way, as mentioned previously, the flowing medium 15, after flowing along the filter element 13, can be deflected and flow below the filter element along the surface 118 into the openings 14 and through the spacer 11.

A filter element 13 is diagrammatically illustrated in FIG. 6 by a dot-dash line.

As shown, for example, in FIGS. 7 and 3, the central hole of the filter element 13 is coaxial to the center line 16 of the hole 12 of the spacer 11.

Disposed on the two surfaces 118 and 119 of the spacer 11 are a plurality of raised bosses 29 that project from these surfaces. In order to facilitate illustration, in FIGS. 6 and 7 these bosses 29 are symbolically illustrated in one quadrant only by dots that are disposed along circles. The bosses 29 can have different configurations, as shown in FIGS. 8 and 9. In the embodiment illustrated in FIGS. 8a and 8b, in a plane parallel to the surfaces 118, 119, the bosses 29 have an essentially drop-shaped cross-sectional shape, and, as shown in FIG. 8a, can also have an extension orthogonal to the surfaces 118, 119. In the embodiment illustrated in FIGS. 9a and 9b, in a plane parallel to the surfaces 118 and 119, the boss 29 has an essentially spherical or round cross-sectional shape. It is conceivable to use either one or the other shape of the bosses 29 for a spacer 11, or to even use both shapes of the bosses 29 for the same spacer 11.

As shown in FIGS. 6 and 7, the bosses 29 are disposed around the center line 16 on concentric circles. However, it is also conceivable to dispose the bosses 29 in any other suitable desired manner on the surfaces 118, 119.

It is also possible to dispose on the surfaces 30 of the lands 18, which surfaces 30 are disposed essentially parallel to the surfaces 118, 119 of the spacer 11, raised bosses 29 that project from the surfaces 30 (see in particular FIG. 3). However, the bosses 29 on the surfaces 30 of the lands 18 are only of such a height that relative to the surfaces 118, 119 of the spacer 11, the bosses of the lands extend exactly to the same height as do the bosses 29 on the surfaces 118, 119. This assures that the filter element 13 is supported on the bosses 29 in such a way that it extends essentially planar relative to the surfaces 118, 119 of the spacers, and hence that the filter element 13 also contacts the sealing rings 24, 25, at sufficient preloading of the system, in a sealing manner accompanied by slight deformation of the cross-sectional shape of the seals 24, 25, as shown in FIG. 3.

A plurality of raised, pin-like projections is provided in the region about the central hole 12 on the outer surface 118 of the spacer 11 and these projections 31 project from the surface 118. On the other surface 119 of the spacer 11, there is provided a plurality of recesses 32, with the projections 31 and recesses 32 of a given spacer 11 respectively being spaced the same distance from the center line 16 of the hole 12 relative to a common central axis 33 that passes through each pair of projections 31 and recesses 32. These projections and recesses of the spacer 11 generally have the same cross-sectional shape; in the illustrated embodiment, this is a circular cross-sectional shape. By means of the pin-like projections 31 and the recesses 32 on each surface or side of the spacer 11, filter element stacks of any desired size can be assembled in a very precisely aligned manner.

Each spacer 11 has an outer, circumferential rim 34, 35 for the two surfaces 118, 119. As can be clearly seen in FIGS. 2 and 3, one of the rims 34 is higher, relative to the normal surface of the surface 118, by at least the thickness of a filter element 13. As previously mentioned, the filter element 13 is placed in the thus-formed, disk-like hollow space, with one surface 130 of the filter element (the outer surface in FIG. 3) coming to rest essentially planar with the shoulder portion 21. When a plurality of spacers 11 is assembled to form a filter element stack such as that illustrated in FIG. 1, a filter element 13 is disposed between each two such spacers, with the surface 131 of the filter element 13 resting upon the bosses 29 of the surface 118 of the spacer, while the other surface 130 of the filter element rests upon the bosses 29 of the other surface 119 of the adjacent spacer 11.

As previously mentioned, the flowing medium 15 flows in a meander-like manner one time upon the surface 118 of the spacer 11 in the direction toward the openings 14 (see FIG. 6), where it is deflected and flows upon the surface 119 (see FIG. 7) away from the openings 14, on side A; in the region of the outwardly closed boundary edges of the filter element (diaphragm pad) the flowing medium is deflected between the rim 35 of one spacer and the rim 34 of the other spacer, and flows back in the direction of the openings 14, on side B, of the adjacent spacer 11.

As a result of the thin sheets of the diaphragm of the filter element 13, the flowing medium 15 is filtered. The filtrate is produced in the space between the two surfaces 130 and 131. This filtrate, as indicated by the arrow in FIG. 3, exists from one end out of the filter element 13 and into the filtrate discharge channel 20, from where, via the filtrate discharge holes 19, the filtrate flows along the securing bolt 103 of FIG. 1. The filtrate is collected in a suitable manner, and exits via the filtrate outlet 112.

Due to the high inner pressure in the region between the surfaces of the filter element 13 and the surfaces of the spacer 11, a good sealing effect of the sealing rings 24, 25 between the filter element 13 and the inner space that is formed between the spacer 11 and the filter element in each case is provided; thus, in all operating states, a reliable separation between the flowing medium circulation and the filtrate circulation is assured.

The spacers of the present invention can advantageously be produced in an economical and operationally reliable manner from plastic, with polystyrene being particularly suitable. It has been shown that due to the fact that they are safe for drinking water, especially acrylonitrile-butadiene-styrene copolymers (ABS), styrene-acrylonitrile copolymers (SAN), as well as Luran are particularly suitable for the manufacture of the inventive spacers. However, this does not preclude producing the spacers from metallic materials or from composite materials, such as a combination of metal and plastic.

The present invention is, of course, in no way restricted to the specific disclosure of the specification and drawings, but also encompasses any modifications within the scope of the appended claims.

What we claim is:

1. In a spacer for guiding flowing medium, constructed and arranged for use in an apparatus for filtering and separating such flowing medium via reverse osmosis and ultrafiltration, said spacer constructed and arranged for use with a respective filter element being disposed as a membrane pad having flowing medium that flows on both sides thereof in a location sandwiched between each two adjacent spacers, each said spacer having a substantially disk-like configuration with a central hole, and said spacers being constructed and arranged such that said flowing medium flows about said spacers, the improvement therewith comprising:

means that form a plurality of spaced-apart openings in said spacer constructed and arranged such that said flowing medium passes through said openings in a location disposed projecting about said central hole of said spacer and through which the flowing medium as a permeate drainage occurs via said membrane pad to said central hole for discharge passage thereof.

2. A spacer according to claim 1, in which each of said openings has a slot-like configuration, including two long sides that extend essentially radially outwardly from a center line of said central hole, and two transverse ends that are shorter than said long sides.

3. A spacer according to claim 2, in which each of said slot-like openings has a trapezoidal cross-sectional shape.

4. A spacer according to claim 1, in which, immediately radially outwardly of an opening, remote from said central hole, said spacer is tapered in a direction toward said central hole.

5. A spacer according to claim 1, in which said spacer has two oppositely directed outer surfaces, each of which is substantially disposed in a plane that extends perpendicular to a center line of said central hole; and in which between each two spaced-apart openings, each of said spacer surfaces is provided with a land that extends therefrom.

6. A spacer according to claim 5, in which said central hole has a peripheral rim region provided with a plurality of filtrate discharge holes that extend into a filtrate discharge channel that is disposed about said center line of said central hole at a predetermined distance therefrom, with said filtrate discharge channel being provided for filtrate that exits from radially inner ends of said filter elements.

7. A spacer according to claim 6, in which one of said surfaces of said spacer is provided with a shoulder portion that extends from said surface and delimits said filtrate discharge channel.

8. A spacer according to claim 5, in which each of said spacer surfaces is provided with a circumferential, groove-like recess that is disposed about said central hole of said spacer and serves to accommodate a respective sealing ring, with the radial distance of each of said recesses from said center line of said central hole being greater than the radial distance between said center line and an inner rim portion of a central hole of said filter element.

9. A spacer according to claim 5, in which at least one of said surfaces of said spacer is provided with a plurality of raised bosses that project from that surface.

10. A spacer according to claim 9, in which each of said lands has a surface that extends essentially parallel to the associated spacer surface, with each land surface being provided with at least one raised boss that projects from this surface.

11. A spacer according to claim 10, in which relative to a plane that is parallel to said surfaces of said spacer, said bosses have an essentially circular cross-sectional shape.

12. A spacer according to claim 10, in which relative to a plane that is parallel to said surfaces of said spacer, said bosses have an essentially drop-like cross-sectional shape.

13. A spacer according to claim 10, in which relative to a plane that is parallel to said surfaces of said spacer, said bosses have an essentially spherical cross-sectional shape.

14. A spacer according to claim 5, in which in a zone immediately adjacent said central hole, one of said spacer surfaces is provided with a plurality of pin-like projections that extend from said surface, and the other of said spacer surfaces is provided with a plurality of recesses, with said projections and recesses being paired up in such a way that relative to an imaginary common central axis that extends through that pair, they are spaced the same distance from said center line of said central hole of said spacer.

15. A spacer according to claim 14, in which said projections and recesses have the same cross-sectional shape.

16. A spacer according to claim 5, in which each of said surfaces of said spacer has a radially outer circumferential rim, with one of said rims extending further than the other from its spacer surface by at least the thickness of a filter element.

17. A spacer according to claim 1, in which said spacer is made of plastic.

18. A spacer according to claim 17, in which said plastic is selected from the group consisting of polystyrene, acrylonitrile-butadiene-styrene copolymers, and styrene-acrylonitrile-copolymers.

* * * * *